United States Patent
Lee et al.

(10) Patent No.: US 8,565,265 B2
(45) Date of Patent: Oct. 22, 2013

(54) METHOD AND APPARATUS FOR TRANSMITTING AND RECEIVING IN-BAND SIGNALING INFORMATION IN A WIRELESS BROADCASTING SYSTEM

(75) Inventors: Hak-Ju Lee, Incheon (KR); Hwan-Joon Kwon, Suwon-si (KR); Yeon-Ju Lim, Seoul (KR); Jae-Yoel Kim, Suwon-si (KR); Sung-Ryul Yun, Suwon-si (KR); Hong-Sil Jeong, Seoul (KR); Seho Myung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1000 days.

(21) Appl. No.: 12/396,982

(22) Filed: Mar. 3, 2009

(65) Prior Publication Data
US 2009/0219918 A1    Sep. 3, 2009

(30) Foreign Application Priority Data

Mar. 3, 2008   (KR) .................. 10-2008-0019636

(51) Int. Cl.
*H04J 3/24* (2006.01)
(52) U.S. Cl.
USPC ........................................ 370/473
(58) Field of Classification Search
USPC ................ 370/473, 474, 475, 496, 471
See application file for complete search history.

(56) References Cited

U.S. PATENT DOCUMENTS

| | | | |
|---|---|---|---|
| 8,126,127 B2 | 2/2012 | Hsu et al. | |
| 2006/0242222 A1 | 10/2006 | Radhakrishnan et al. | |
| 2009/0103649 A1* | 4/2009 | Vare et al. | 375/295 |
| 2009/0190677 A1* | 7/2009 | Jokela et al. | 375/260 |
| 2009/0203326 A1* | 8/2009 | Vesma et al. | 455/69 |
| 2011/0216666 A1 | 9/2011 | Radhakrishnan et al. | |

FOREIGN PATENT DOCUMENTS

| | | |
|---|---|---|
| JP | 2005-516474 | 6/2005 |
| JP | 2008-533870 | 8/2008 |
| JP | 2008-536361 | 9/2008 |
| WO | WO 2006/099319 | 9/2006 |
| WO | WO 2009/047606 | 4/2009 |

OTHER PUBLICATIONS

"Frame structure channel coding and modulation for a second generation digital terrestrial television broadcasting system (DVB-T2)", DVB Document A122rl, Jan. 2008.

* cited by examiner

*Primary Examiner* — Ricky Ngo
*Assistant Examiner* — Wei-Po Kao
(74) *Attorney, Agent, or Firm* — The Farrell Law Firm, P.C.

(57) ABSTRACT

A method is provided for transmitting in-band signaling information in a wireless broadcasting system that transmits broadcast service data through a plurality of data Physical Layer Pipes (PLPs) constituting a frame. Non-PLP signaling information is included in a data PLP for a particular broadcast service and the data PLP is transmitted through a current frame, when no data PLP for the particular broadcast service is transmitted in at least one frame to be transmitted within a maximum schedulable period $N_{MAX}$ from a time the current frame is transmitted. The non-PLP signaling information indicates that no data PLP for the particular broadcast service is transmitted within the maximum schedulable period.

22 Claims, 8 Drawing Sheets

METHOD AND APPARATUS FOR TRANSMITTING AND RECEIVING IN-BAND SIGNALING INFORMATION IN A WIRELESS BROADCASTING SYSTEM

PRIORITY

This application claims priority under 35 U.S.C. §119(a) to a Korean Patent Application filed in the Korean Intellectual Property Office on Mar. 3, 2008 and assigned Serial No. 10-2008-0019636, the entire disclosure of which is incorporated herein by reference.

BACKGROUND OF THE INVENTION

1. Field of the Invention

The present invention relates generally to a wireless digital broadcasting system, and more particularly, to a method and apparatus for transmitting and receiving in-band signaling information.

2. Description of the Related Art

In an information society of the $21^{st}$ century, broadcast communication services have begun to enter an era of digitalization, multi-channelization, broadband, high-quality, etc. Particularly, the recent increasing popularization of portable broadcast devices, including high-definition digital televisions and Portable Multimedia Players (PMP), has increased demands for supporting various reception methods of digital broadcast services.

FIG. 1 illustrates a transmission scheme in a conventional broadcasting system.

Referring to FIG. 1, reference numeral 101 indicates one frame. Commonly, the frame 101 includes a preamble 102, a P2-L1 signaling 103, a PLP0-L2 signaling 104, and one or more Physical Layer Pipes (PLPs) 105, 106 and 107. The preamble 102 is a signal generally used to acquire time and frequency synchronization, and synchronization for a frame boundary at a receiver. P2-L1 signaling 103 is a part of the frame 101 where an L1 signaling is transmitted. The L1 signaling, as illustrated in FIG. 1, is also referred to as P2, and means a Layer 1 signaling, or physical layer signaling.

The P2-L1 signaling 103, or the physical layer signaling, includes L1 static information 108, L1 configurable information 109, and L1 dynamic information 110. The L1 static information 108 includes information that is basically static over the passage of time, and such static information may include information on a cell identifier, a network identifier, the number of Radio Frequency (RF) channels, a frame length, a pilot subcarrier location, etc.

The L1 configurable information 109 includes information that may change once in a while, without changing on a frame-by-frame basis, i.e., information that generally lasts for a plurality of frames. Such configurable information may include information on a service identifier, a modulation order used for data transmission for an individual service, a code rate, etc. The L1 dynamic information 110 includes information that may change on a frame-by-frame basis. Such dynamic information may include information about a location where each PLP is transmitted in the current frame, i.e. information about where each PLP starts and ends in the current frame.

The PLP0-L2 signaling 104 is a part of the frame 101 through which an L2 signaling is transmitted. The L2 signaling represents a Layer 2 signaling, or a Medium Access Control (MAC) signaling. Generally, a PLP over which the L2 information is transmitted is also referred to as a PLP0. The PLP0 includes connection information between PLPs and broadcast services to indicate PLPs through which particular services are received. In FIG. 1, the PLP_1 105, the PLP_2 106 and the PLP_N 107 each transmit one or a plurality of broadcast service channels, and are parts of the frame 101 through which actual broadcast data is transmitted, so they can also be referred to as "data PLPs." The data PLPs are PLPs transmitted by Time Division Multiplexing (TDM). The data PLP will be referred to herein as a "data PLP for a broadcast service."

A process of actually receiving a particular broadcast service channel is described with reference to FIG. 1. After acquiring synchronization of the frame through the preamble 102, a receiver gets such information as a transmission scheme by which data is transmitted and a frame length using the P2 part 103, acquires, from the PLP0 104, information indicating a PLP(s) through which its desired a broadcast service channel is transmitted, and then receives broadcast data through the data PLPs 105, 106 and 107.

In order to allow the receiver bypass the above-described process of receiving the preamble, the P2, the PLP0 and the data PLPs in sequence every frame when it receives a particular broadcast service for a predetermined time, a technology is used that transmits same PLP's L1 dynamic information in a next frame, on a PLP for the particular broadcast service using in-band signaling. A data reception method based on in-band signaling is illustrated in FIG. 2A.

FIG. 2A illustrates an example of a data reception method in a basic in-band signaling system.

Referring to FIG. 2A, a frame #k 201 and a frame #(k+1) 20 are shown. Frame #k includes a preamble 203, P2-L1 signaling 204, PLP0-L2 signaling 205, PLP_1 206, PLP_2 207 and PLP_N 208, as described in connection with FIG. 1. Frame #(k+1) 202 includes a preamble 209, P2-L1 signaling 210, PLP0-L2 signaling 211, PLP_1 212, PLP_2 213 and PLP_N 214.

Assume that a particular receiver is receiving a particular broadcast service channel through a PLP_2, as illustrated in FIG. 2A. The receiver receives the PLP_2 207 being transmitted in the frame #k 201. The PLP_2 207 includes in-band signaling information. The in-band signaling information may include a location, or dynamic information, of the PLP_2 207 in the next frame, i.e. the frame #(k+1) 202. Based on the dynamic information, the receiver can directly receive the PLP_2 213 in the next frame, without receiving the P2 part 210 to receive the PLP_2 213 as indicated by reference numeral 217. That is, after receiving the PLP_2 207 in the frame #k 201, the receiver may power off its receiving units until it receives the PLP_2 213 (including the next data) of the frame #(k+1) 202, i.e. the next frame, thereby saving the power.

The PLP_2 207 in the frame #k 201 and the PLP_2 213 in the frame #(k+1) 202 have data for the same broadcast service. In order to distinguish the PLPs, the PLP_2 213 transmitted after the PLP_2 207 in the frame #k, which the receiver is presently receiving, can also be referred to herein as a "next packet." However, the term "next packet" may indicate a data PLP included in any of frames, including not only the frame right after the current frame, but also all its succeeding frames.

The in-band signaling information 216 may include location(s) of one or multiple different data PLPs as indicated by reference numeral 218. When the receiver makes service switching to the PLP_N 214 while receiving the PLP_2 207, the receiver can obtain location information of the PLP_N 214 in the next frame in advance using the already acquired in-band signaling information. Therefore, the receiver can immediately determine the location of the PLP_N 214 without receiving and demodulating the P2 part 210 of the next frame, thereby reducing its power consumption.

It is assumed in the basic system of FIG. 2A that the in-band signaling information always includes the location and control information of the immediately next frame (frame #(k+1)) after the current frame (frame #k). However, in case that the PLP_2 207 does not exist in the next frame, an extended system can be defined.

FIG. 2B illustrates an example of a data reception method in an extended in-band signaling system. Frame #k 251 includes a preamble 253, P2-L1 signaling 254, PLP0-L2 signaling 255, PLP_1 256, PLP_2 257 and PLP_N 258. Frame #(k+N) 252 includes a preamble 259, P2-L1 signaling 260, PLP0 signaling 261, PLP_1 262, PLP_2 263 and PLP_N 264.

In FIG. 2B, when PLP_2 257 exists in the current frame #k 251 and the next packet exists not in the next frame #(k+1), but in frame #(k+N) 252 (where N is a natural number greater than or equal to 2), it is possible to record location information of the frame #(k+N) 252 in in-band signaling information as shown by reference numeral 270 in FIG. 2B. This scenario is available when a transmitter can store data PLPs for all services in advance, and a definition thereof can be given only when it is possible to predict location information of data PLPs for all the services in advance, for multiple frames. However, the extended system is unavailable when it is not possible to collect all data PLPs with regard to multiple succeeding frames.

The transmitter in the basic system can schedule up to the next one frame immediately after the current frame, while the transmitter in the extended system can schedule up to the next $N_{MAX}$ frames after the current frame (when the current frame is a frame #k, the last one of the next $N_{MAX}$ frames becomes a frame #(k+$N_{MAX}$)). A combined system is referred to as a broadcasting system herein, and the maximum number of frames (the maximum number of predictable frames) that the transmitter can schedule is defined as the maximum schedulable period $N_{MAX}$ (where $N_{MAX}$ is a natural number greater than or equal to 1). However, in the broadcasting system, when the next packet after a data PLP for a particular broadcast service exists in a frame #($N_{MAX}$+1), i.e. when the next packet after a particular data PLP exists in a frame after the last one of the next $N_{MAX}$ frames that the transmitter can schedule, information to be included in in-band signaling information becomes uncertain, making seamless reception impossible at a receiver operating in in-band signaling. Therefore, when an index of the frame where the next packet is transmitted exceeds the maximum number of frames that the transmitter can schedule, receivers cannot receive the packet, causing a packet loss. When an attempt to prevent the packet loss is made, the receivers cannot acquire scheduling information for the next packet until it receives and demodulates L1 signaling from a preamble P2 after a delay of the frame #($N_{MAX}$+1) which is the next frame, generating a fatal error.

SUMMARY OF THE INVENTION

The present invention has been made to address at least the above problems and/or disadvantages and to provide at least the advantages described below. Accordingly, an aspect of the present invention provides an in-band signaling information transmission/reception method and apparatus for maximizing a power saving effect while seamlessly receiving data by in-band signaling.

According to one aspect of the present invention, a method is provided for transmitting in-band signaling information in a wireless broadcasting system that transmits broadcast service data through a plurality of data Physical Layer Pipes (PLPs) constituting a frame. Non-PLP signaling information is included in a data PLP for a particular broadcast service and the data PLP is transmitted through a current frame, when no data PLP for the particular broadcast service is transmitted in at least one frame to be transmitted within a maximum schedulable period $N_{MAX}$ from a time the current frame is transmitted. The non-PLP signaling information indicates that no data PLP for the particular broadcast service is transmitted within the maximum schedulable period.

According to another aspect of the present invention, an apparatus is provided for transmitting in-band signaling information in a wireless broadcasting system that transmits broadcast service data through a plurality of data Physical Layer Pipes (PLPs) constituting a frame. The apparatus includes a transmitter for including non-PLP signaling information in a data PLP for a particular broadcast service and transmitting the data PLP through a current frame, when no data PLP for the particular broadcast service is transmitted within a maximum schedulable period $N_{MAX}$ from a time the current frame is transmitted. The non-PLP signaling information indicates that no data PLP for the particular broadcast service is transmitted through at least one frame, which is to be transmitted within the maximum schedulable period.

According to a further aspect of the present invention, a method is provided for receiving in-band signaling information in a wireless broadcasting system that transmits broadcast service data through a plurality of data Physical Layer Pipes (PLPs) constituting a frame. Control information for a next packet after a data PLP for a particular broadcast service is acquired from in-band signaling information of the data PLP for the particular broadcast service in an incoming frame. It is determined from the control information whether a frame where the next packet exists is transmitted within a maximum schedulable period $N_{MAX}$. The next packet in the frame where the next packet exists is found and received, when the frame where the next packet exists is transmitted within the maximum schedulable period.

According to an additional aspect of the present invention, an apparatus is provided for receiving in-band signaling information in a wireless broadcasting system that transmits broadcast service data through a plurality of data Physical Layer Pipes (PLPs) constituting a frame. The apparatus includes an in-band signaling information extractor for acquiring in-band signaling information of a data PLP for a particular broadcast service in an incoming frame. The apparatus also includes a controller for acquiring control information for a next packet after the data PLP for the particular broadcast service from the acquired in-band signaling information and determining from the control information whether a frame where the next packet exists is transmitted within a maximum schedulable period $N_{MAX}$. The controller also controls a data PLP receiving unit to determine and receive the next packet in the frame where the next packet exists, when the frame where the next packet exists is transmitted within the maximum schedulable period.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
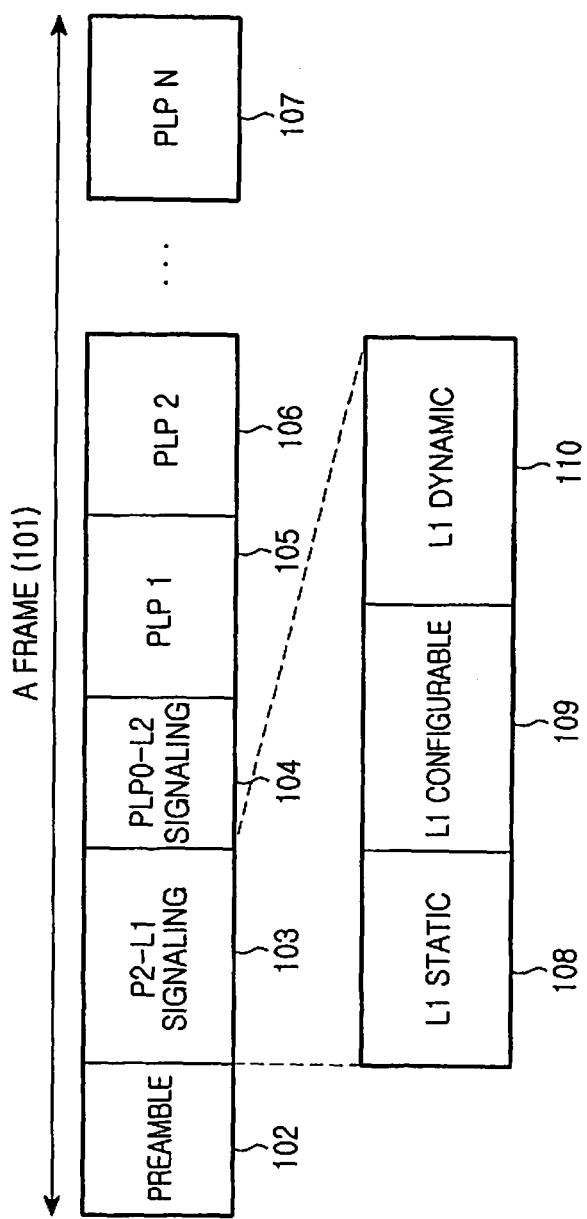
FIG. 1 illustrates a frame structure of a conventional broadcasting system.
Figure 2A:
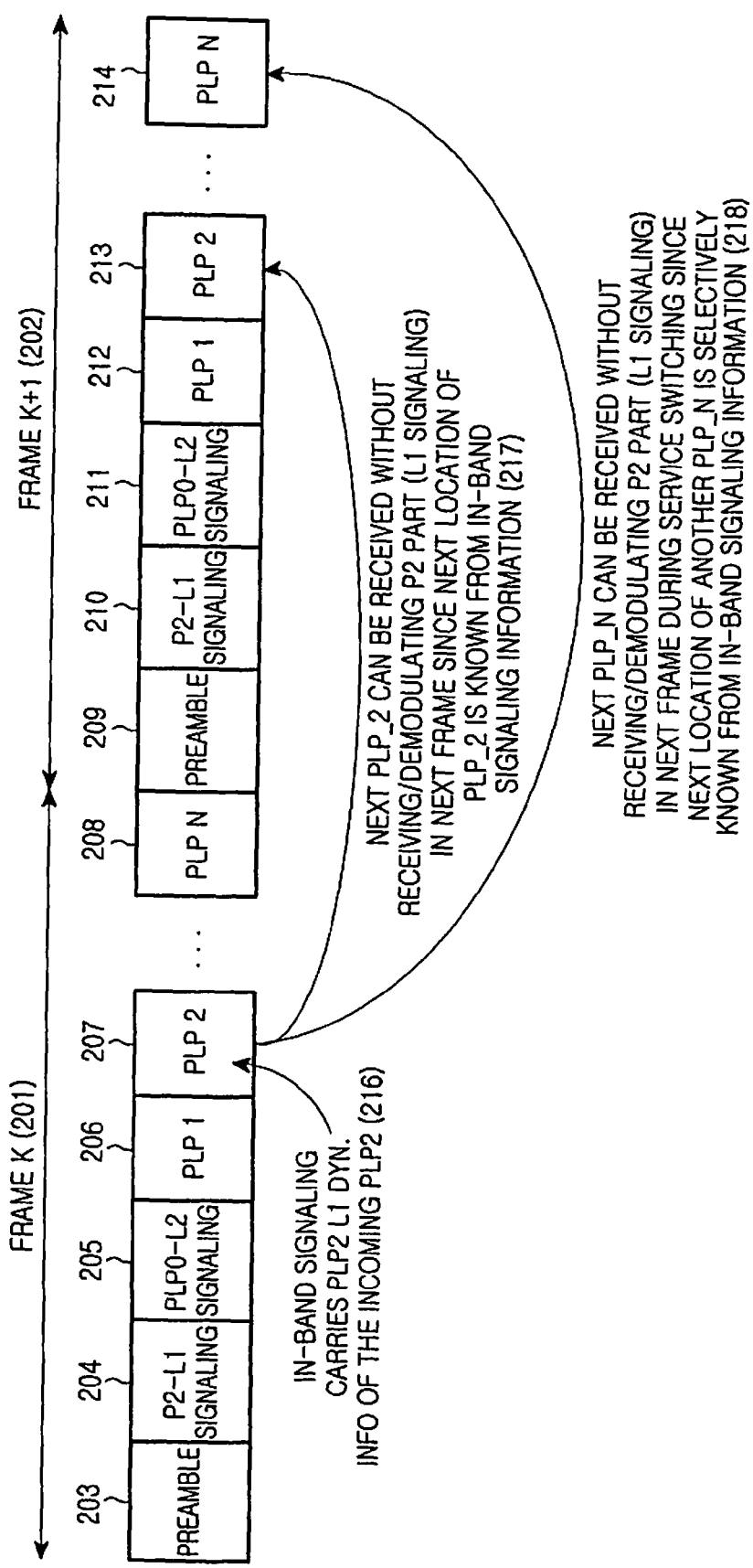
FIG. 2A illustrates an example of a data reception method in a basic in-band signaling system.
Figure 2B:
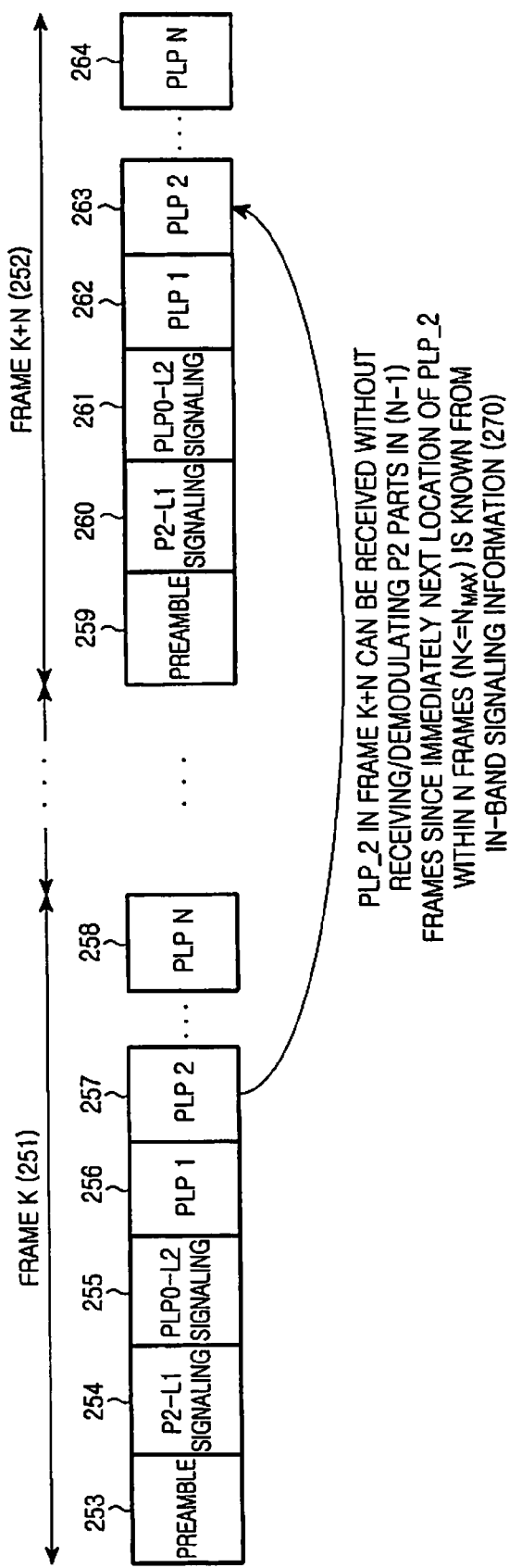
FIG. 2B illustrates an example of a data reception method in an extended in-band signaling system.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used herein are not limited to their dictionary meanings, but, are used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3A:
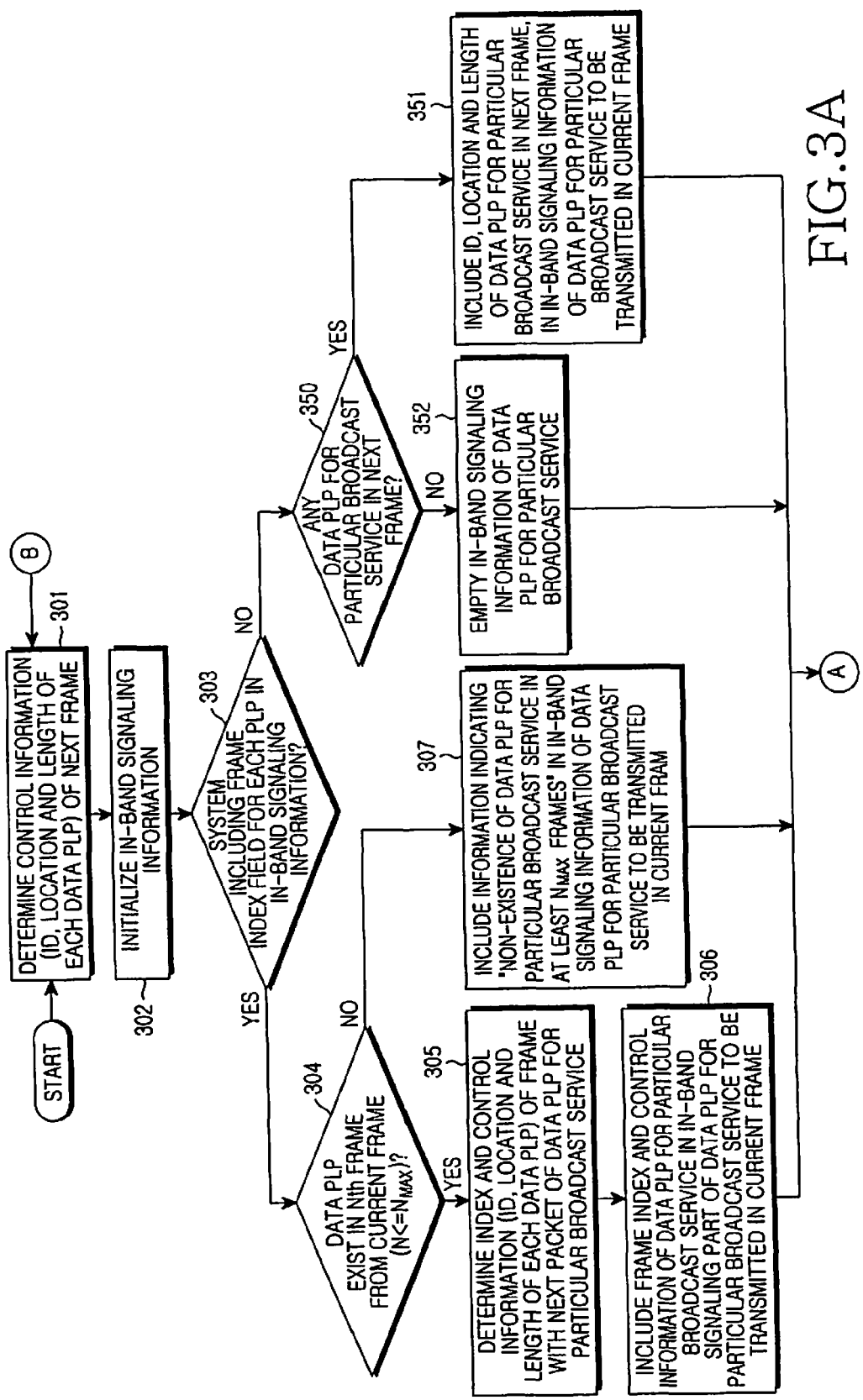
FIGS. 3A and 3B are a flow diagrams illustrating an operation of a transmitter according to an embodiment of the present invention.
Figure 3B:
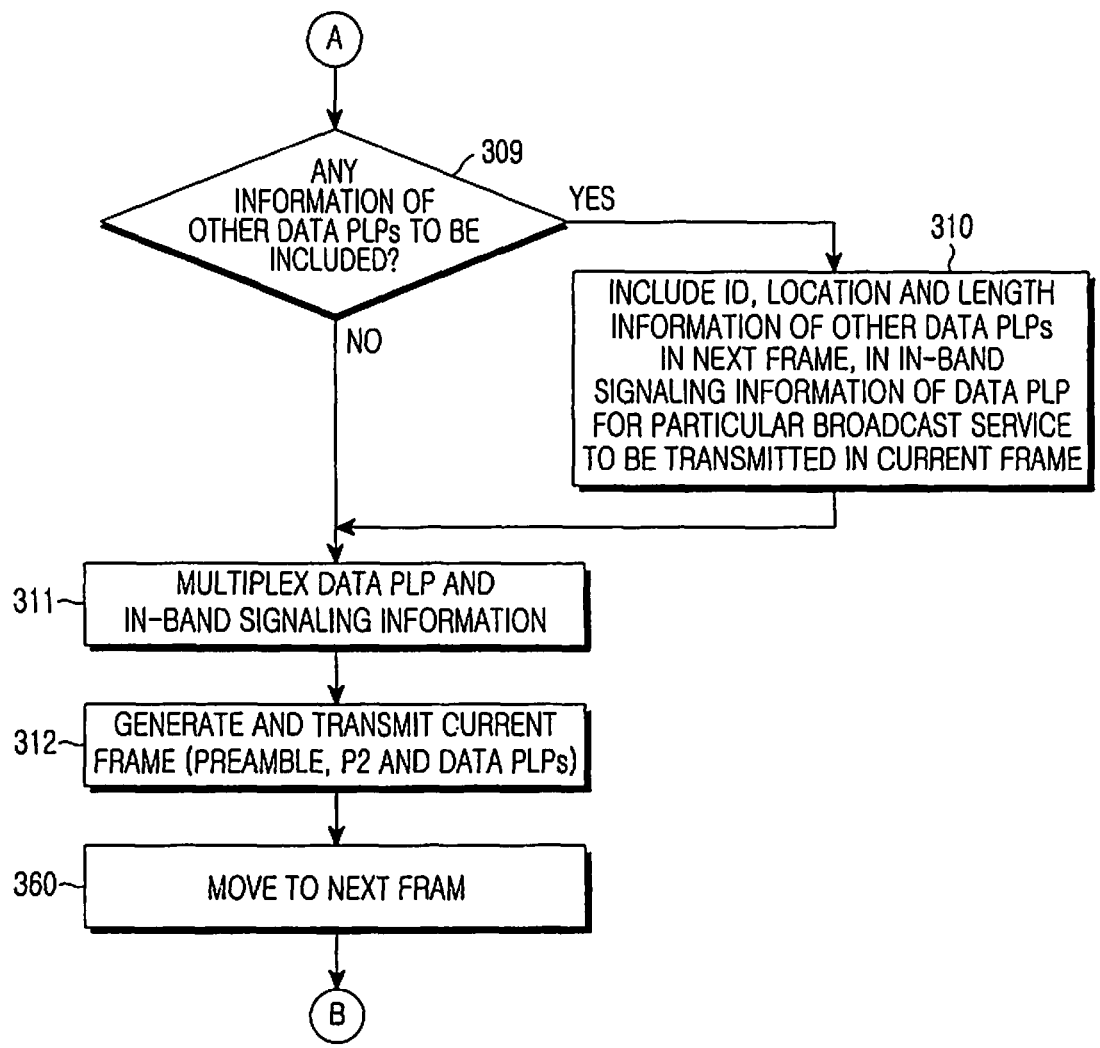

FIGS. 3A and 3B are flow diagrams illustrating an operation of a transmitter according to an embodiment of the present invention.

Referring to FIGS. 3A and 3B, in step 301, the transmitter determines P2 information (L1 static, L1 configurable, and L1 dynamic including a location of each data PLP) and PLP0 information of the next frame. In step 302, the transmitter initializes an in-band signaling part, which is to be multiplexed to data PLPs. The term "next frame" mentioned in step 301 indicates an arbitrary frame among the frames following the current frame #k, and can be any one of a frame #(k+1), a frame #(k+3), and a frame #(k+$N_{MAX}$).

The following process is branched depending on whether the system in operation can predict control information (scheduling information, IDs of data PLPs in the next frame, etc.) of only the frame immediately after the current frame, or can collect control information for frames beyond the immediately next frame. That is, the transmitter determines in step 303 whether the system is adapted to include a frame index field for each data PLP in in-band signaling information. When the system is not designed to include a frame index field for each data PLP in in-band signaling information, i.e. when the system can collect control information of only the immediately next frame, the transmitter proceeds to step 350.

Herein, the term "immediately next frame" indicates the frame right after the current frame, and the term "next frame" indicates any frame succeeding the current frame.

The transmitter determines in step 350 whether a data PLP for a particular broadcast service, in which in-band signaling information is included, (hereinafter referred to as a "data PLP for a particular broadcast service") exists in the immediately next frame. When a data PLP for the particular broadcast service exists in the immediately next frame, the transmitter includes, in step 351, ID, location and length information of the data PLP for the particular broadcast service in the immediately next frame (#k+1), in an in-band signaling part of the data PLP for the particular broadcast service, which is to be transmitted in the current frame #k.

On the contrary, when a data PLP for the particular broadcast service does not exist in the immediately next frame in step 350, the transmitter stops collecting any more information on the next packet after the data PLP for the particular broadcast service, in step 352, since it cannot predict control information for more frames (frames after the frame #(k+1)) with the current system. The methodology then proceeds to step 309, with the in-band signaling information for the data PLP for the broadcast service being empty.

If the system in operation can collect in advance control information of all data PLPs in the frame #(k+2), which is the $2^{nd}$ frame after the frame #k, or the current frame, up to the frame #(k+$N_{MAX}$), which is the $(N_{MAX})^{th}$ frame after the frame #k, its operation is as follows.

That is, the transmitter determines, in step 303, whether the system can include a frame index field indicating a location of a data PLP in in-band signaling information. When the frame index field is included in the in-band signaling information in step 303, the transmitter proceeds to step 304, since it is meant that the system can collect control information of the frame #(k+2) to the frame #(k+$N_{MAX}$).

Because the system can predict up to the frame #(k+$N_{MAX}$) in advance in the current frame #k, the transmitter determines in step 304 whether a data PLP for a particular broadcast service exists within N frames after the current frame #k. Here, $N_{MAX}$ can be previously agreed upon as a predetermined value by the transmitter and the receiver, or can be provided to the receiver by the transmitter through separate signaling. Compared with an $N_{MAX}$=1 system, the system that can collect in advance control information of all data PLPs in the frame #(k+2) through the frame #(k+$N_{MAX}$), can additionally provide information N on the next frame where each data PLP is transmitted, so that a frame index field is included in in-band signaling information. The frame index field is used as information indicating a sequence number of a frame where the next packet after each data PLP exists.

When a data PLP for a particular broadcast service exists in an $N^{th}$ frame (where 1≤N≤$N_{MAX}$) in step 304, the transmitter determines, in step 305, an index of a frame where the next packet after a data PLP for a particular broadcast service exists, and control information such as ID, location and length of each data PLP. The frame index N of the frame where the data PLP is to be transmitted next, and the control information, are included in in-band signaling information of the data PLP for the particular broadcast service, which is to be transmitted in the current frame #k, in step 306.

When a data PLP for the particular broadcast service does not exist within (k+$N_{MAX}$) frames in step 304, the transmitter includes information indicating "that a data PLP for a particular broadcast service does not exist at least within (k+$N_{MAX}$) frames" (hereinafter referred to as "non-PLP signaling information"), in in-band signaling information in step 307. The non-PLP signaling information indicates that no data PLP for the particular broadcast service is transmitted through multiple frames, which will be transmitted within the maximum schedulable period $N_{MAX}$.

A method for transmitting the non-PLP signaling information can be divided into the following three methods. In a first method, one of the frame index field values may be defined to indicate the non-PLP signaling information. In a second method, a separate field may be defined to indicate the non-PLP signaling information.

In a third method, the same expression can be made by combining the frame index field defined for the proposed system and data PLP's length information in the existing in-band signaling information. As an example of the third method, the non-PLP signaling information is indicated when the frame index field indicates $k+N_{MAX}$ and the data PLP's length information has a value of 0.

Referring now to FIG. 3B, when the generation of the control information for a data PLP for a particular broadcast service is completed in steps 306, 307, 351 and 352, the transmitter determines in step 309 whether there is a need to create control information for a data PLP for another broadcast service. The transmitter determines in step 309 whether there is information on other data PLPs it should further include in in-band signaling information of a data PLP for a particular broadcast service, which is to be transmitted in the current frame. The control information can be made for one data PLP or multiple other data PLPs, selectively. When it is determined in step 309 that control information of other data PLPs should be included for fast service switching, the transmitter adds the control information of other data PLPs in in-band signaling information of the data PLP for the particular broadcast service in step 310.

When the generation of in-band signaling information of the data PLP for the particular broadcast service is completed in step 310, the transmitter multiplexes the in-band signaling information and data information of the data PLP for the particular broadcast service in step 311. Here, the transmitter repeatedly performs all of steps 301 to 311 on each data PLP included in the frame #k. In this way, the transmitter generates and transmits the current frame #k in step 312. Thereafter, the transmitter moves to the next frame in step 360 and returns to step 301 in order to process the next frame.

Figure 4:
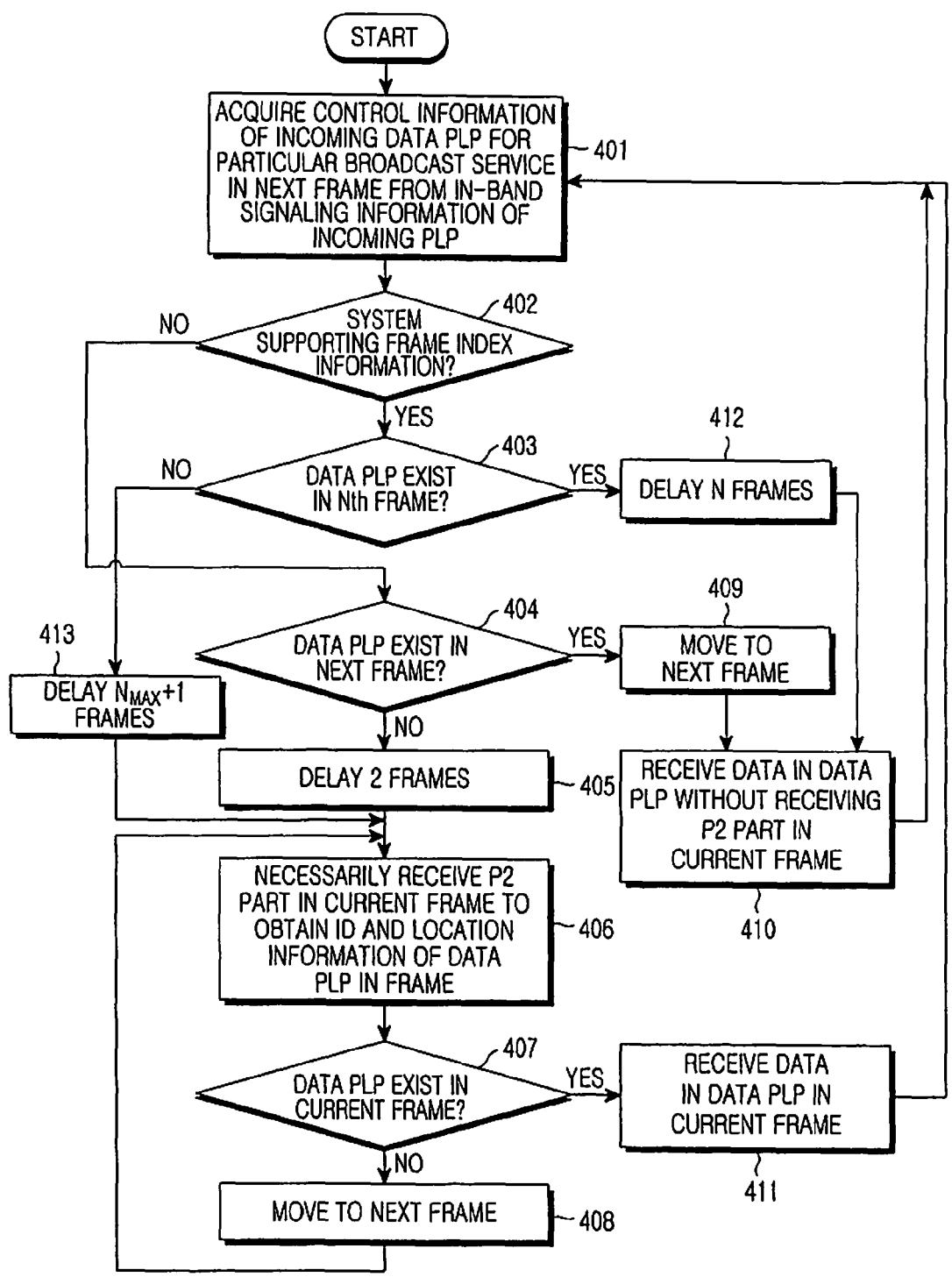
FIG. 4 is a flow diagram illustrating an operation of a receiver according to an embodiment of the present invention.

FIG. 4 is a flow diagram illustrating an operation of a receiver according to an embodiment of the present invention.

Referring to FIG. 4, the receiver acquires, in step 401, location information of an incoming data PLP (a data PLP which is presently being received) for a particular broadcast service in the next frame, from in-band signaling information of the incoming data PLP. The process following step 401 is branched according to whether the system in operation is a system having a frame index field to support $N_{MAX} \geq 2$, or a system capable of transmitting control information of only the frame right after the current frame without the frame index field. That is, the receiver determines in step 402 whether the system in operation supports frame index information of an incoming data PLP for a particular broadcast service, and proceeds to one of steps 403 and 404 depending on the determination result.

When it is determined in step 402 that the system can transmit control information of only the frame right after the current frame #k, the receiver determines in step 404 whether control information of a data PLP for a particular broadcast service exists in in-band signaling information. When the control information of the data PLP for the particular broadcast service exists in the in-band signaling information, the receiver moves to a frame #(k+1), or the frame right after the current frame in step 409, recognizing that a data PLP for the particular broadcast service exists in the frame #(k+1). In step 410, the receiver determines a location of the data PLP in the frame #(k+1) and receives data on the data PLP. After step 410, the receiver returns to step 401 and demodulates in-band signaling information existing in an incoming data PLP for the particular broadcast service.

Otherwise, when it is determined in step 404 that control information of a data PLP for a particular broadcast service does not exist in in-band signaling information of the immediately next frame, or the frame #(k+1), the receiver proceeds to step 405, determining that a data PLP for the particular broadcast service does not exist in the immediately next frame #(k+1), and moves by 2 frames to a frame #(k+2), which is a frame after the frame #(k+1).

Thereafter, because the receiver can no longer acquire location information of the data PLP for the particular broadcast service from the in-band signaling information, the receiver necessarily receives, in step 406, a P2 part in the frame #(k+2), which is the frame the receiver is presently receiving, and acquires an ID and location information of the data PLP for the particular broadcast service, included in the frame #(k+2). When a data PLP for the particular broadcast service exists in the frame #(k+2) in step 407, the receiver determines, in step 411, a location of the data PLP for the particular broadcast service in the frame #(k+2) and receives data in the location.

After step 411, the receiver acquires in-band signaling information from a data PLP for a particular broadcast service, and acquires again control information in the next frame using the acquired in-band signaling information in step 401.

So far, a description has been given of a receiver's operation when the system has control information of only the frame right after the current frame.

For a system that can acquire and transmit control information for a frame after multiple frames, a receiver's operation is as follows. That is, the receiver determines in step 402 whether the system supports frame index information of an incoming data PLP for a particular broadcast service. When the system supports frame index information of the data PLP, the receiver determines in step 403 whether an incoming data PLP exists in an $N^{th}$ frame. Here, the receiver determines whether an incoming data PLP for a particular broadcast service exists in an Nth frame, based on the non-PLP signaling information described in step 307. Upon recognizing in step 403 that an incoming data PLP for a particular broadcast service exists in an $N^{th}$ ($\leq N_{MAX}$) frame, the receiver immediately waits for N frames in step 412, and then receives data in a location of the data PLP for the particular broadcast service in the frame #(k+N) in step 410.

However, upon detecting in step 403 that an incoming data PLP for a particular broadcast service does not exist within the next $(N_{MAX})^{th}$ frame (i.e. a frame #(k+$N_{MAX}$)), the receiver delays up to an $(N_{MAX}+1)^{th}$ frame (i.e. a frame k+$N_{MAX}$+1) after the current frame in step 413, and necessarily receives a P2 part of the frame #(k+$N_{MAX}$+1) in step 406. The receiver determines in step 407 whether a data PLP for the particular broadcast service exists in the frame #(k+$N_{MAX}$+1). When no data PLP for the particular broadcast service exists in the received frame in step 407, the receiver moves to the next frame in step 408. Steps 406, 407, 408 and 411 have been described in detail. Thereafter, the receiver determines a location of the data PLP for the particular broadcast service, receives data in the location, and then returns to step 401 to repeat its succeeding steps.

Figure 5:
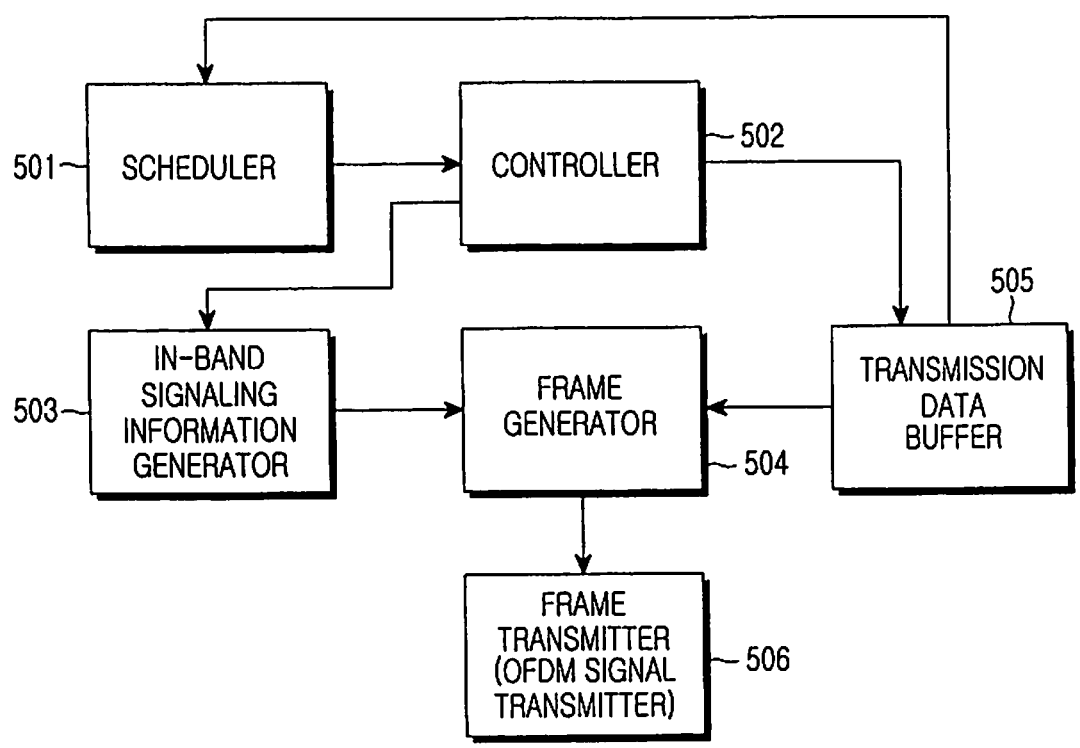
FIG. 5 is a diagram illustrating a structure of a transmitter apparatus according to an embodiment of the present invention.

FIG. 5 is a diagram illustrating a structure of a transmitter apparatus according to an embodiment of the present invention. Referring to FIG. 5, the transmitter includes a scheduler 501, a controller 502, an in-band signaling information generator 503, a frame generator 504, a transmission data buffer 505, and a frame transmitter 506.

The transmission data buffer 505 is a memory in which transmission data for several broadcast service channels is buffered. The scheduler 501 performs predetermined scheduling depending on the state of the buffered data. The scheduling operation includes determining control information such as an ID and location information of a data PLP for a particular frame. The scheduling result is provided to the controller 502. The controller 502 controls the in-band signaling information generator 503 to generate in-band signaling information as described in connection with FIGS. 3A and 3B, and also controls the frame generator 504 to generate one frame by controlling outputs of the transmission data buffer 505 and the in-band signaling information generator 503. The generated frame is transmitted by the frame transmitter 506 as described with reference to FIGS. 3A and 3B. The frame transmitter 506 may be equal to a common Orthogonal Frequency Division Multiplexing (OFDM) signal transmitter.

In an embodiment of the present invention, when no data PLP for a particular broadcast service is transmitted in at least one frame which is to be transmitted within the maximum schedulable period $N_{MAX}$ after the time the current frame is transmitted, the transmitter includes non-PLP signaling information in the data PLP for the particular broadcast service and transmits it through the current frame. In addition, when the data PLP does not have the frame index field and a data PLP for the particular broadcast service does not exist in the frame, which is to be transmitted immediately after the current frame, the transmitter transmits the current frame with in-band signaling information to be transmitted in the data PLP being empty. Further, when the data PLP does not include the frame index field and a data PLP for the particular broadcast service exists in the frame which is to be transmitted right after the current frame, the transmitter inserts control information for the data PLP for the particular broadcast service into in-band signaling information to be included in the data PLP within a frame to be transmitted immediately after the current frame, and then transmits the current frame.

In addition, when the data PLP includes the frame index field and a data PLP for the particular broadcast service exists in a frame to be transmitted after the current frame within the maximum schedulable period $N_{MAX}$, the transmitter determines an index of a frame where a data PLP for the particular broadcast service exists, in in-band signaling information to be included in the data PLP. The transmitter also determines control information for the data PLP for the particular broadcast service, inserts the determined frame index and control information for the data PLP for the particular broadcast service into the current frame, and transmits the current frame.

Meanwhile, the transmitter may indicate non-existence of a data PLP for the particular broadcast service in a frame to be transmitted after the current frame within the maximum schedulable period in the three methods described above.

In the first method, when the data PLP includes the frame index field and a data PLP for the particular broadcast service does not exist in a frame to be transmitted after the current frame within the maximum schedulable period $N_{MAX}$, the transmitter indicates non-existence of the data PLP for the particular broadcast service in a frame to be transmitted after the current frame within the maximum schedulable period using one of the frame index field's values of the data PLP.

In the second method, when the data PLP includes the frame index field and a data PLP for the particular broadcast service does not exist in a frame to be transmitted after the current frame within the maximum schedulable period $N_{MAX}$, the transmitter indicates non-existence of the data PLP for the particular broadcast service in a frame to be transmitted after the current frame within the maximum schedulable period by defining a separate field in the data PLP.

In the third method, when the data PLP includes the frame index field and a data PLP for the particular broadcast service does not exist in a frame to be transmitted after the current frame within the maximum schedulable period $N_{MAX}$, the transmitter indicates non-existence of the data PLP for the particular broadcast service in a frame to be transmitted after the current frame within the maximum schedulable period by combining the frame index field with length information of the data PLP.

Figure 6:
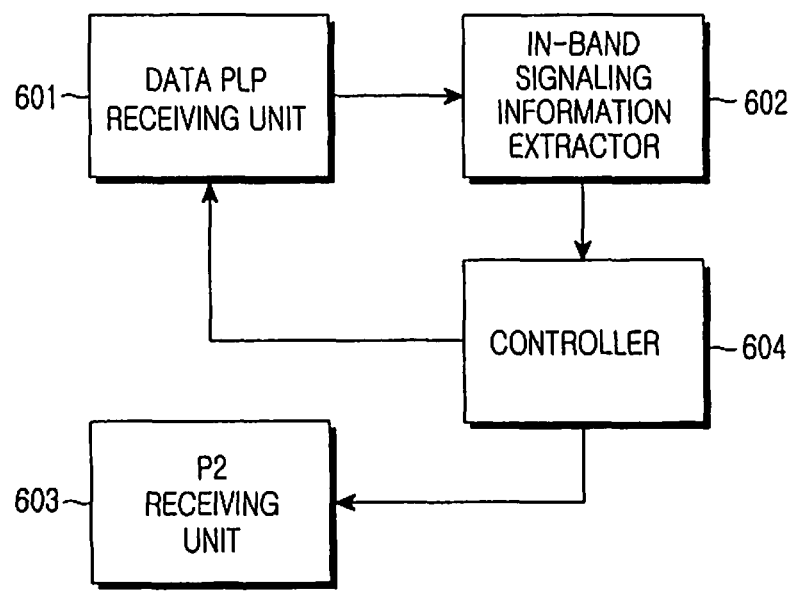
FIG. 6 is a diagram illustrating a structure of a receiver apparatus according to an embodiment of the present invention.

FIG. 6 is a diagram illustrating a structure of a receiver apparatus according to an embodiment of the present invention.

Referring to FIG. 6, the receiver includes a data PLP receiving unit 601, a physical layer (P2) receiving unit 603, an in-band signaling information extractor 602, and a controller 604. The data PLP receiving unit 601 is a part for receiving a desired data PLP using a common OFDM signal receiver. The in-band signaling information extractor 602 is a block for extracting in-band signaling information from the data obtained by the data PLP receiving unit 601. The extracted in-band signaling information is provided to the controller 604. The controller 604 delays as many frames as it wants, using the in-band signaling information, and then controls the data PLP receiving unit 601 or the P2 receiving unit 603 as described in connection with FIG. 4.

In an embodiment of the present invention, the controller 604 acquires control information for the next packet after the data PLP for the particular broadcast service from the in-band signaling information acquired by the in-band signaling information extractor 602, and determines from the control information whether a frame where the next packet exists is transmitted within the maximum schedulable period $N_{MAX}$. When the frame where the next packet exists is transmitted within the maximum schedulable period $N_{MAX}$, the controller 604 controls the data PLP receiving unit 601 to determine and receive the next packet in the frame where the next packet exists.

In addition, when the frame where the next packet exists is transmitted after the maximum schedulable period, the controller 604 controls the P2 receiving unit 603 to receive physical layer signaling information in a frame #($N_{MAX}$+1) after the maximum schedulable period from the current frame, and controls the data PLP receiving unit 601 to receive the next packet using the received physical layer signaling information. As stated in step 403 of FIG. 4, the controller 604 determines whether the frame where the next packet exists is transmitted within the maximum schedulable period, using any one of a frame index field' value included in the in-band signaling information of the data PLP for the particular broadcast service, a separate field indicating whether the next packet is transmitted in the maximum schedulable period, and a combination of the frame index field and length information of the data PLP.

Moreover, when the frame index information does not exist in the data PLP and no data PLP for the particular broadcast service exists in the next frame, the controller 604 controls the P2 receiving unit 603 to receive physical layer signaling information in a frame #(k+2) that comes two frames after the current frame #k, and also controls the data PLP receiving unit 601 to receive the next packet using the received physical layer signaling information.

As is apparent from the foregoing description, the receiver can seamlessly receive data and maximize the power saving effect by transmitting and receiving the in-band signaling information proposed by the present invention.

Embodiments of the present invention can also be embodied as computer-readable codes on a computer-readable recording medium. The computer-readable recording medium is any data storage device that can store data, which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain preferred embodiments thereof, it will be understood by those skilled in the art that various changes in form and details may be made therein without departing from the spirit and scope of the invention as defined by the appended claims and their equivalents.

What is claimed is:

1. A method for transmitting in-band signaling information by a transmitter in a wireless broadcasting system that transmits broadcast service data through a plurality of data Physical Layer Pipes (PLPs) constituting a frame, the method comprising the steps of:
    determining whether in-band signaling information of data PLP includes a frame index field indicating a frame index for each data PLP;
    if the in-band signaling information includes the frame index field and no data PLP is transmitted in at least one frame within a predetermined period from a current frame, including non-PLP signaling information in the in-band signaling information and transmitting the in-band signaling information through the current frame; and
    if the in-band signaling information does not include the frame index field and no data PLP is transmitted in a next frame after the current frame, indicating that no data PLP is transmitted in the next frame by emptying the in-band signaling information,
    wherein the non-PLP signaling information indicates that no data PLP is transmitted within the predetermined period.

2. The method of claim 1, wherein the non-PLP signaling information is provided by using at least one of a value of the frame index, a separate field indicating whether the data PLP is transmitted in the at least one frame, and a combination of the frame index field and length information of the data PLP.

3. The method of claim 1, wherein the non-PLP signaling information is provided by using at least one value of the frame index field, when the in-band signaling information includes the frame index field and no data PLP is transmitted within the predetermined period.

4. The method of claim 1, wherein the non-PLP signaling information is provided by using a separate field in the data PLP, when the in-band signaling information includes the frame index field and no data PLP is transmitted within the predetermined period.

5. The method of claim 1, wherein the non-PLP signaling information is provided by combining a frame index field with length information of the data PLP in the in-band signaling information, when the in-band signaling information includes the frame index field and no data PLP is transmitted within the predetermined period.

6. The method of claim 1, further comprising inserting control information for a data PLP to be transmitted in the next frame, into the in-band signaling information and transmitting the in-band signaling information including the inserted control information in the current frame, when the in-band signaling information does not include the frame index field and when a data PLP is transmitted in the next frame.

7. The method of claim 1, further comprising:
    determining a frame index where a data PLP exists, in in-band signaling information to be included in the data PLP, and determining control information for the data PLP, when the in-band signaling information includes the frame index field and a data PLP is transmitted within the predetermined period; and
    inserting the determined frame index and control information for the data PLP into the in-band signaling information, and transmitting into the in-band signaling information in the current frame.

8. An apparatus for transmitting in-band signaling information in a wireless broadcasting system that transmits broadcast service data through a plurality of data Physical Layer Pipes (PLPs) constituting a frame, the apparatus comprising:
    a transmitter; and
    a controller for determining whether in-band signaling information of data PLP includes a frame index field indicating a frame index for each data PLP, if the in-band signaling information includes the frame index field and no data PLP is transmitted in at least one frame within a predetermined period from a current frame, including non-PLP signaling information in the in-band signaling information and controlling the transmitter for transmitting the in-band signaling information through a current frame, when no data PLP is transmitted within a maximum schedulable period from the current frame, and if the in-band signaling information does not include the frame index field and no data PLP is transmitted in a next frame after the current frame, indicating that no data PLP is transmitted in the next frame by emptying the in-band signaling information,
    wherein the non-PLP signaling information indicates that no data PLP is transmitted through at least one frame, which is to be transmitted within the predetermined period.

9. The apparatus of claim 8, wherein the non-PLP signaling information is provided by using at least one of a value of the frame index field, a separate field indicating whether the data PLP is transmitted in the at least one frame, and a combination of the frame index field and length information of the data PLP.

10. The apparatus of claim 8, wherein the controller inserts control information for a data PLP to be transmitted in the next frame, into the in-band signaling information and controls the transmitter to transmit the in-band signaling information including the inserted control information in the current frame, when the in-band signaling information does not include the frame index field and when a data PLP is transmitted in the next frame.

11. The apparatus of claim 8, wherein the controller indicates that no data PLP is transmitted within the predetermined period, by using at least one value of the frame index field, when the in-band signaling information includes a frame index field and no data PLP is transmitted within the predetermined period.

12. The apparatus of claim 8, wherein the controller indicates that no data PLP is transmitted within the predetermined period, by using a separate field in the data PLP, when the in-band signaling information includes the frame index field and no data PLP is transmitted within the predetermined period.

13. The apparatus of claim 8, wherein the controller indicates that no data PLP is transmitted within the predetermined period, by combining the frame index field with length information of the data PLP, when the in-band signaling information includes the frame index field and no data PLP is transmitted within the predetermined period.

14. The apparatus of claim 8, wherein when the in-band signaling information includes a frame index field and a data PLP is transmitted within the predetermined period, the controller determines a frame index where a data PLP exists, in the in-band signaling information, determines control information for the data PLP, inserts the determined frame index and control information for the data PLP into the in-band signaling information, and transmits the in-band signaling information in the current frame.

15. A method for receiving in-band signaling information by a receiver in a wireless broadcasting system that transmits broadcast service data through a plurality of data Physical Layer Pipes (PLPs) constituting a frame, the method comprising:
    receiving a data PLP in a current frame;
    if non-PLP signaling information is detected from in-band signaling information of the data PLP, determining that no data PLP is transmitted within the predetermined period from the current frame; and
    if the in-band signaling information is empty, determining that no data PLP is transmitted in a next frame after the current frame,
    wherein the non-PLP signaling information is detected when the in-band signaling information includes a frame index field indicating a frame index for each data PLP, and the in-band signaling information is empty when the in-band signaling information does not include the frame index field.

16. The method of claim 15, further comprising:
    receiving physical layer signaling information in a frame after the predetermined period from a the current frame, when detection of the non-PLP signaling information is failed from the data PLP and the in-band signaling information includes the frame index field; and
    receiving the data PLP transmitted within the predetermined period from the current frame using the received physical layer signaling information.

17. The method of claim 15, wherein
    the non-PLP signaling information is detected by using at least value of the frame index field, a separate field indicating whether a data PLP is transmitted within the predetermined period, and a combination of the frame index field and length information of the data PLP.

18. The method of claim 15, further comprising:
    receiving physical layer signaling information in a frame that comes 2 frames after the current frame, when the in-band signaling information does not include the frame index field and the non-PLP signaling information is detected from the data PLP; and
    receiving the data PLP transmitted within the predetermined period from the current frame using the received physical layer signaling information.

19. An apparatus for receiving in-band signaling information in a wireless broadcasting system that transmits broadcast service data through a plurality of data Physical Layer Pipes (PLPs) constituting a frame, the apparatus comprising:
    a data PLP receiving unit for receiving a data PLP in a current frame; and
    a controller for determining if non-PLP signaling information is detected from in-band signaling information of the data PLP, that no data PLP is transmitted within the predetermined period from the current frame, and if the in-band signaling information is empty, determining that no data PLP is transmitted in a next frame after the current frame,
    wherein the non-PLP signaling information is detected when the in-band signaling information includes a frame index field indicating a frame index for each data PLP, and the in-band signaling information is empty when the in-band signaling information does not include the frame index field.

20. The apparatus of claim 19, wherein when detection of the non-PLP signaling information fails from the data PLP and the in-band signaling information includes the frame index field, the controller controls a physical layer receiving unit to receive physical layer signaling information in a first frame after the predetermined period, and controls the data PLP receiving unit to receive the data PLP transmitted within a predetermined period from the current frame using the received physical layer signaling information.

21. The apparatus of claim 19, wherein the controller determines whether the non-PLP signaling information is detected from the data PLP, by using at least one value of the frame index field, a separate field indicating whether a data PLP is transmitted within the predetermined period, and a combination of the frame index field and length information of the data PLP.

22. The apparatus of claim 19, wherein when the in-band signaling information does not include the frame index field and the non-PLP signaling information is detected from the data PLP, the controller controls a physical layer receiving unit to receive physical layer signaling information in a frame that comes two frames after the current frame, and controls the data PLP receiving unit to receive the data PLP transmitted within a predetermined period from the current frame using the received physical layer signaling information.

* * * * *